Nov. 28, 1933. T. G. BAXENDEN ET AL 1,936,654
PHOTOGRAPHIC FILM PACK
Filed Jan. 20, 1933 2 Sheets-Sheet 2
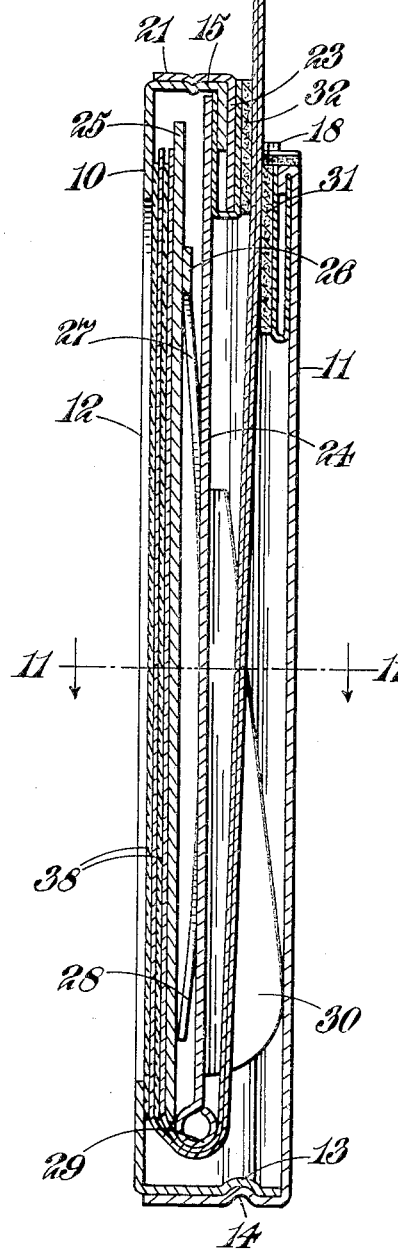
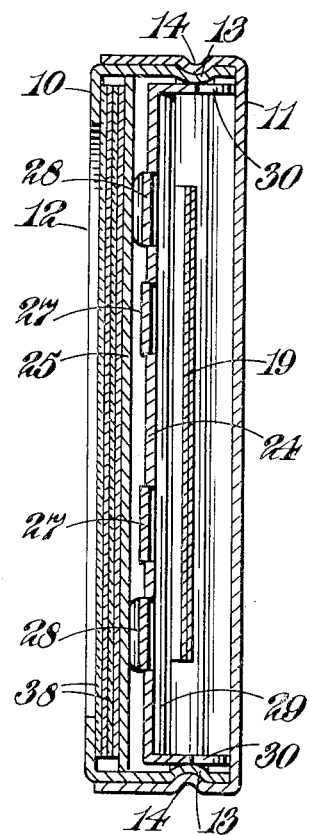
INVENTORS
Thomas George Baxenden
Francis John Shepherd
by their attorneys
Byrnes, Stebbins, Parmelee and Blenko Patented Nov. 28, 1933

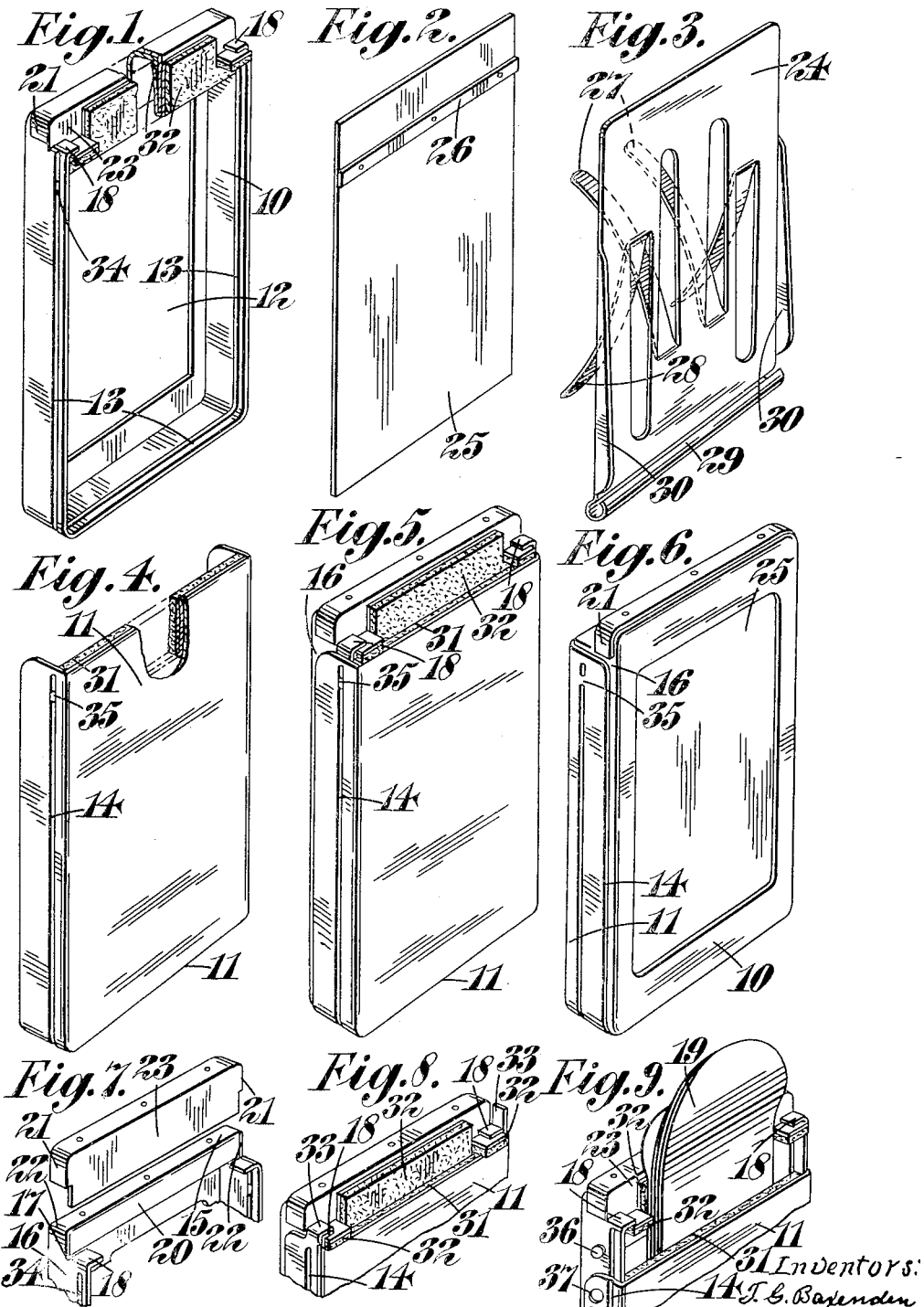

1,936,654

UNITED STATES PATENT OFFICE 1,936,654

PHOTOGRAPHIC FILM PACK

Thomas George Baxenden, Watford, and Francis John Shepherd, Mill Hill, London, England, assignors to Ilford Limited, Ilford, England, a British company, and Novobax Limited, Watford, England, a British company Application January 20, 1933, Serial No. 652,726, and in Great Britain January 25, 1932

8 Claims. (Cl. 95—22)

This invention comprises improvements in or relating to photographic film-packs of the type comprising a flat rectangular case arranged to contain the films and constituted by two shells each formed, like the push-on lid of a box, as a plate with a marginal flange, arranged to fit together forming a box with the marginal flange of one shell lying within the marginal flange of the other, and the top end flange (i. e. that end flange which will be adjacent to the draw-tab opening) of one shell removed to permit of assembly of the two shells by the endwise sliding movement of one in relation to the other. In film-packs of the above type the case is divided by a partition into a front exposure compartment and a rear light-tight compartment and the front wall of the case is provided with a window through which the film in the front compartment may be exposed; and the individual films may be transferred in turn from the front to the rear compartment of the case round the lower end of the partition by means of draw-tabs attached to the films and projecting through a slot in the rear compartment at the top of the case.

The present invention provides, in or for a film-pack of the type described above, a case wherein the corresponding side and bottom end flanges of the two shells are so formed throughout their length, one as a counterpart of the other, as to provide between them, an interfitting engagement to act as guiding means for the assembly by endwise sliding movement of one shell upon the other, as means to prevent separation of the shells by movement of one in relation to the other in a direction at right angles to their general plane and as a light trap extending substantially continuously around three marginal flanges of the case.

In one form of the invention the two shells are of seamless drawn metal, and at positions intermediate in the depth of the side and bottom end flanges of the shells, said flanges are formed, by pressing rolling or stamping, with co-operating projections and grooves arranged to provide the interfitting engagement aforesaid.

The film-pack case may be furnished with a catch constituted by co-operating parts on the side flanges of the two shells arranged to be brought into engagement when the case is closed to prevent accidental opening of the case by endwise sliding movement of one shell in relation to the other. The catch aforesaid may be provided by forming, near the top end of the case, corresponding brakes in the co-operating projections and grooves which extend along the side flanges of the shells. Again the catch may be formed by co-operating pin-and-hole devices provided on the side flanges of the shells, or again the back shell may be held in its closed position after assembly of the pack, by lugs at the top end of the back shell, which are bent over co-operating parts on the front shell.

Some constructions embodying the invention will now be described, by way of example, with reference to the accompanying drawings in which, Figure 1 is a perspective view showing the front shell of the case, Figure 2 is a perspective view showing the presser-plate of the partition, Figure 3 is a perspective view showing the spring-plate of the partition, Figure 4 shows in perspective the back shell of the case.

Figure 5 shows in perspective the two shells assembled to form the finished case, Figure 6 is a view similar to Figure 5 but looking on the front of the finished case, Figure 7 is a perspective view showing in separated relationship the draw-tab end of the front shell and the cap which is used to complete the formation of this end, Figure 8 is a view of the upper part of the case showing an alternative method of securing the two shells together, Figure 9 is a perspective view showing another alternative method of securing the shells in place.

Figure 10 is a cross-section through the assembled film-pack in a plane perpendicular to the front surface of the pack and passing through the longer center line of the pack, and Figure 11 is a cross-section through the assembled film-pack at right angles to the cross-section shown in Figure 10 and upon the line 11—11 indicated in Figure 10.

Like reference numerals indicate like parts throughout the figures.

The film-pack case comprises two shells 10, 11 of seamless drawn metal, the shell 10 (which will hereinafter be referred to as the front shell) being formed with the exposure aperture or window 12, and the other shell 11, (which will hereinafter be referred to as the back shell) forming the rear wall of the case. The back shell 11 is formed like a push-on lid but the top end flange is removed to permit, as previously described, the endwise sliding assembly of the two shells. Extending completely around the side flanges and bottom end flange of the front shell there is a shallow groove 13 located near the free edges of the flanges. The back shell 11 is arranged to slide over the front shell and is provided with an inwardly projecting ridge 14 extending completely around its side and bottom end flanges and located in a position such that it will be in register with the aforesaid groove 13 on the flanges of the front shell when the latter lie within the corresponding flanges of the back shell. With this arrangement the case may be assembled by presenting the open top end of the back shell 11 to the bottom end of the front shell 10 and then sliding the two shells together like a drawer, the co-operating ridges 14 and grooves 13 on the side flanges acting as guides during this movement. When the box has in this way been completely closed the ridge 14 on the bottom end flange of the back shell 11 is brought into engagement with the groove 13 in the corresponding flange of the front shell 10, and this interfitting engagement between the ridge and groove extending completely around three sides of the case provides an effective light-tight closure.

The top ends of the two shells are constructed in the following way (see particularly Figure 7) in order to provide the draw-tab opening and its associated light trap. The top end flange 15 of the front shell is reduced to about half the depth of the other flanges, by slitting the top corners half way down and turning over the flap of metal 20 thus freed into a position parallel with the front of the case. The side flanges 16 of the front shell are slit inwardly at 17 from their top edges at the level of the upper edge of the reduced end flange 15 and in a plane parallel with the front of the shell. These slits extend a short way inwards from the top of the shell and provide small portions of metal 18 which are turned inwardly at right angles to the side flanges 16 to form stops to prevent complete withdrawal of the film 38 when the draw-tabs 19 (Figure 9) are pulled parallel to the front of the case. The top end of the front shell is closed in by a small cap 21 which is arranged to fit over the reduced end flange 15, the turned-over flap 20, and those portions 22 of the side flanges which extend beyond the turned-in stops 18 and which, by the turning in of the stops, are reduced to the same height as the end flange 15. The top 23 of the cap extends inwardly from the top end flange 15 up to and a short distance beyond the turned-in stops 18 and forms a wall parallel with the front of the shell. The space between this wall (which will hereinafter be referred to as the short medial wall 23) and the front of the shell forms a housing to receive and locate the top end of a partition which divides the case into front and rear compartments. The cap 21 aforesaid is conveniently attached to the top end of the front shell by welding. When the pack is to be made up the partition with the films and their draw-tabs folded about it, is inserted in the front case with the top end of the partition and the top edges of the films received in the recess between the short medial wall 23 and the front of the case, and the outer ends of the draw-tabs overlie the short medial wall. The case is then closed by sliding on the back shell. As will be appreciated this arrangement makes the assembly of the pack an easy matter.

The partition, in the illustrated examples, comprises a spring-plate 24 (Figure 3) and a presser-plate 25 (Figure 2). The presser-plate 25, which faces the window 12 in the front shell, is a plain rectangular sheet of metal of such dimensions that it will be a loose fit within the front shell. To the rear face of the presser-plate and spaced apart a short distance from its top edge, a thin narrow metal strip 26, extending parallel with the top edge of the plate, is attached, conveniently by spot welding. This strip 26 forms an abutment for co-operation with the top springs of the spring-plate 24 as will hereinafter be described. The spring-plate 24 is a rectangular sheet of about the same dimensions as the presser-plate and has formed upon it four spring-blades 27, 28 which are constituted by tongues of metal severed (except at their roots) from the presser-plate and pressed out therefrom towards the front side of the plate, i. e. that side which will be adjacent to the presser-plate 25 when the pack is assembled. As will be seen from Figure 3 the two tongues 27 extend in a direction towards the top edge of the spring-plate, while the other tongues 28 extend in the opposite direction. The lower edge of the presser-plate is bent into approximately cylindrical form to provide a smooth edge 29 over which the films will be drawn on transfer from the front to the rear compartment of the case. When the presser-plate 25 and the spring-plate 24 are assembled in the front shell the top springs 27 engage on the abutment provided by the strip 26 on the presser-plate and so locate the presser-plate in such a position that its lower edge will be clear of, and will thus not interfere with, the rounded guide formed by the lower edge 20 of the spring-plate. The springs 27, 28 give a substantially uniformly distributed pressure over the surface of the presser-plate 25 and they are provided for the purpose of ensuring that as the number of films in the front compartment is reduced by transfer to the rear compartment, the remaining film or films in the front compartment will be held firmly and with an even pressure up to the exposure window. The spring-plate 24 is also formed with two wing pieces 30 formed by turned-back portions at the side edges of the plate. When the two shells of the case are assembled the wing pieces 30 bear on the inner surface of the back wall of the rear shell and they thus serve to locate the lower end of the spring-plate at substantially the same level (i. e. in the thickness of the case) as the top end is located by the front medial wall 23.

Light-tightness at the draw-tab opening is ensured firstly by means of a plush lining 31 (Figures 4, 8 and 9) secured to the back shell 11 along its top edge, and secondly by a V-shaped strip 32 (Figures 1, 8 and 9) of cardboard, one wing of which is slipped under the short medial wall 23 of the front shell and the other wing of which is lined with plush and overlies the medial wall 23 and also the turned-in stops 18.

In one embodiment of the invention, shown in Figure 8, the back shell 11 is held in its closed position, after assembly of the pack, by lugs 33 at the top end of the back shell which are bent over the turned-in stops 18 on the front shell. In Figure 8 one of the lugs 33 is shown in its turned-over position while the other lug is shown in its original extended position.

In another construction, shown in Figures 1–6, the catch to hold the two shells together is provided by forming a break 34 in the groove 13 around the front shell near the top of the case, and a corresponding break 35 in the ridge 14 on the back shell. This construction affords, on the two side flanges of the front shell 10, abutments over which the back shell has to be sprung in order completely to close the case.

In a still further construction, shown in Figure 9, co-operating pin-and-hole catches 36, 37 are provided on the side flanges of the shells near the top of the case.

In U. S. patent to Herbert Charles Rich and Bertram Vincent Storr No. 1,886,589, dated November 8, 1932, there is described a film-pack which is of the same general type as that to which the present invention relates and which has in the case an opening in two communicating parts, whereof one part is arranged to provide an outlet for the withdrawal of the draw-tabs but is combined with a stop or stops to prevent the withdrawal of the films and whereof the other part of the opening is arranged to provide an outlet clear of the stop or stops aforesaid through which the films may be completely withdrawn from the case. In the construction illustrated in Figures 1–6 and in Figure 9, an outlet clear of the turned-in stops 18 through which the films may be completely withdrawn from the case, can be provided by sliding the back shell 11 a short distance away from its closure position. In this way a gap is furnished between the top edge of the back shell 11 and the turned-in stops 18 on the front shell which extends to the full width of the case and through which a film may if desired be completely withdrawn from the case by a pull on its draw-tab 19 in a direction more or less perpendicular to the plane of the back wall of the case. Figure 9 shows the way in which the back shell 11 may be slid away from the closure position in order to form a full width slot for the complete withdrawal of a film. This manipulation feature applies to any construction in which the two shells 10, 11, are retained in their closure position by something in the nature of a snap fastener such as is embodied in the examples described with reference to Figures 1–6 and to Figure 9, but does not of course apply to that structure, described with reference to Figure 8, where the case is permanently closed by turning over lugs 33 upon the rear shell onto the film stops 18 on the front shell. In that case, however, a permanent opening to permit of the complete withdrawal of the films may be formed (in a manner similar to that described in said U. S. Patent No. 1,886,589) by foreshortening the rear wall of the case, i. e. at the top edge of the back shell 11. Moreover even in the construction where sliding movement between the two shells is permitted after closure of the case, the feature of a permanent withdrawal opening as above described may be embodied.

Instead of forming the film stops by turned-in portions of the side flanges of the front shell 10, they may be formed by bent-out portions of the end cap 21 which provides the short medial wall. Again in another alternative construction the film stops may be in the form of lugs struck out from the partition presser-plate 25.

We claim:—

1. A film-pack case comprising two shells of seamless drawn metal each formed, like the push-on lid of a box, as a plate with seamless marginal flanges having rounded corners, arranged to fit together forming a box with the marginal flanges of one shell lying within those of the other, and the top end flange of one shell removed to permit of assembly of the two shells by endwise sliding movement of one in relation to the other, the corresponding side and bottom end flanges of the two shells being so formed throughout their length, one as a counterpart of the other, as to provide between them, an interfitting engagement to act as guiding means for the assembly by endwise sliding movement of one shell upon the other, as means to prevent separation of the shells by movement of one in relation to the other in a direction at right angles to their general plane, and as a light trap extending substantially continuously around three marginal flanges of the case and extending round the corners of said flanges in smooth curves.

2. A film-pack case comprising two shells of seamless drawn metal each formed like the push-on lid of a box, as a plate with seamless marginal flanges having rounded corners, arranged to fit together forming a box with the marginal flanges of one shell lying within those of the other and the top end flange of one shell removed to permit assembly of the two shells by endwise sliding movement of one in relation to the other combined with co-operating projections and grooves formed in corresponding side and bottom end flanges of the shells at positions intermediate in the depth thereof, and arranged to provide an interfitting engagement to act as guiding means for the assembly by endwise sliding movement of one shell upon the other, as means to prevent separation of the shells by movement of one in relation to the other in a direction at right angles to their general plane, and as a light trap extending substantially continuously around three marginal flanges of the case and extending round the corners of said flanges in smooth curves.

3. A film-pack case as claimed in claim 1 combined with a catch constituted by co-operating parts on the side flanges of the two shells arranged to be brought into engagement when the case is closed to prevent accidental opening of the case by endwise sliding movement of one shell in relation to the other.

4. A film-pack case as claimed in claim 2 combined with a catch arranged to be brought into engagement when the case is closed to prevent accidental opening of the case by endwise sliding movement of one shell in relation to the other, said catch being furnished by forming, near the top end of the case, corresponding breaks in the co-operating projections and grooves on the side flanges of the two shells.

5. A film-pack case as claimed in claim 2 combined with a catch arranged to be brought into engagement when the case is closed to prevent accidental opening of the case by endwise sliding movement of one shell in relation to the other, said catch being formed by co-operating pin-and-hole devices on the side flanges of the shells near the top of the case.

6. A film-pack case as claimed in claim 2 combined with a catch arranged to be brought into engagement when the case is closed to prevent accidental opening of the case by endwise sliding movement of one shell in relation to the other, said catch being constituted by lugs formed at the top end of the back shell and arranged to be bent over co-operating parts on the front shell after assembly of the pack.

7. In a film-pack case, the combination of a front shell of seamless drawn metal formed, like the push-on lid of a box, as a plate with a seamless marginal flange having rounded corners, and provided with an exposure window in the plate, a back shell similarly formed of seamless drawn metal like a push-on lid with a seamless flange with rounded corners and having its top end flange removed to permit of assembly of the two shells by the endwise sliding movement of one in relation to the other, and to provide a draw-tab opening, a partition arranged to divide the case into a front exposure compartment and a rear light-tight compartment, means associated with corresponding side and bottom end flanges of the two shells to form between them an interfitting engagement adapted to act as guiding means for the assembly by endwise sliding movement of one shell upon the other, as means to prevent separation of the shells by movement of one in relation to the other in a direction at right angles to their general plane, and as a light trap extending substantially continuously around three marginal flanges of the case and extending round the corners of said flanges in smooth curves.

8. A film-pack case according to claim 7 combined with a light trap for the draw-tab opening comprising a plush lining secured to the back shell along its top edge and by a V-shaped strip of cardboard which has one wing lined with plush and which is associated with the front shell.

THOMAS GEORGE BAXENDEN.
FRANCIS JOHN SHEPHERD.